US006457001B1

(12) United States Patent
Ishida

(10) Patent No.: US 6,457,001 B1
(45) Date of Patent: Sep. 24, 2002

(54) METHOD AND APPARATUS FOR DATA RETRIEVAL

(75) Inventor: Yoshihiro Ishida, Chiba (JP)

(73) Assignee: Kawasaki Microelectronics, Inc., Chiba (JP)

( * ) Notice: Subject to any disclaimer, the term of this patent is extended or adjusted under 35 U.S.C. 154(b) by 0 days.

(21) Appl. No.: 09/274,809

(22) Filed: Mar. 23, 1999

(30) Foreign Application Priority Data

Mar. 26, 1998 (JP) .......................................... 10-078765

(51) Int. Cl.$^7$ .............................................. G06F 17/30
(52) U.S. Cl. ................... 707/3; 707/6; 707/10; 707/102; 707/103
(58) Field of Search ........................ 707/10, 102, 103, 707/3, 6; 365/49; 711/108

(56) References Cited

U.S. PATENT DOCUMENTS

| | | | | |
|---|---|---|---|---|
| 5,438,535 A | * | 8/1995 | Lattibeaudiere ............... | 365/49 |
| 5,463,777 A | * | 10/1995 | Bialkowski et al. .......... | 707/103 |
| 5,813,001 A | * | 9/1998 | Bennett ........................... | 707/3 |
| 5,974,045 A | * | 10/1999 | Ohkura et al. ................ | 370/395 |
| 5,995,971 A | * | 11/1999 | Douceur et al. ............. | 707/102 |
| 6,112,207 A | * | 8/2000 | Nori et al. .................... | 707/101 |

OTHER PUBLICATIONS

"Fast Routing Table Lookup Using CAMs", McAuley & Francis, INFOCOM '1993, IEEE, Jun. 1993.*

* cited by examiner

Primary Examiner—Jean M. Corrielus
Assistant Examiner—Cam-Y T. Truong
(74) Attorney, Agent, or Firm—Oliff & Berridge, PLC

(57) ABSTRACT

A method and apparatus for carrying out binary search based on a plurality of retrieval conditions. Retrieval object data is classified into higher order bits and lower order bits. A portion of retrieval key data, in correspondence with the higher order bits of the retrieval object data, constitutes first key data and a portion in correspondence with the lower order bits of the retrieval object data constitutes second retrieval key data. A higher order bit comparing circuit 13 is provided for comparing the higher order bits of the retrieval object data with the first retrieval key data and a lower order bit comparing circuit 14 and for comparing the lower order bits of the retrieval object data with the second retrieval key data. Further, there is provided a determining circuit 16 for determining coincidence or non-coincidence between the retrieval key data and the retrieval object data in accordance with a comparison enabling bit EB indicating coincidence conditions, a comparison result of the higher order bit comparing circuit 13 and comparison result of the lower bit comparing circuit 14.

9 Claims, 5 Drawing Sheets

| COINCIDENCE OF HIGHER ORDER BITS | HIGHER ORDER LARGE/SMALL | LOWER ORDER LARGE/SMALL | LARGE/SMALL |
|---|---|---|---|
| 0 | RETRIEVAL KEY LARGE | - | RETRIEVAL KEY LARGE |
| 0 | RETRIEVAL KEY SMALL | - | RETRIEVAL KEY SMALL |
| 1 | - | RETRIEVAL KEY LARGE | RETRIEVAL KEY LARGE |
| 1 | - | RETRIEVAL KEY SMALL | RETRIEVAL KEY SMALL |

| COINCIDENCE OF HIGHER ORDER BITS | COINCIDENCE OF LOWER ORDER BITS | EB | COIN-CIDENCE | PK COIN-CIDENCE |
|---|---|---|---|---|
| 0 | 0 | 0 | 0 | 0 |
| 0 | 0 | 1 | 0 | 0 |
| 0 | 1 | 0 | 0 | 0 |
| 0 | 1 | 1 | 0 | 0 |
| 1 | 0 | 0 | 0 | 0 |
| 1 | 0 | 1 | 1 | 1 |
| 1 | 1 | 0 | 1 | 0 |
| 1 | 1 | 1 | 1 | 1 |

| COINCIDENCE OF HIGHER ORDER BITS | HIGHER ORDER LARGE/SMALL | LOWER ORDER LARGE/SMALL | LARGE/SMALL |
|---|---|---|---|
| 0 | RETRIEVAL KEY LARGE | - | RETRIEVAL KEY LARGE |
| 0 | RETRIEVAL KEY SMALL | - | RETRIEVAL KEY SMALL |
| 1 | - | RETRIEVAL KEY LARGE | RETRIEVAL KEY LARGE |
| 1 | - | RETRIEVAL KEY SMALL | RETRIEVAL KEY SMALL |

|   | RETRIEVAL DATA | | ASSOCIATIVE DATA | |
|---|---|---|---|---|
|   | VPIIN | VCIIN | VPIOUT | VCIOUT |
| VCC1 | 7AC | 5AB0 | 902 | A77F |
| VCC2 | 7BC | 7890 | 802 | 5432 |
| VPC1 | 123 | 5634 | 345 | 5634 |
| VPC1 | 123 | 2468 | 345 | 2468 |

|   | RETRIEVAL DATA | | ASSOCIATIVE DATA | |
|---|---|---|---|---|
|   | VPIIN | VCIIN | VPIOUT | VCIOUT |
| VCC1 | 7AC | 5AB0 | 902 | A77F |
| VCC2 | 7BC | 7890 | 802 | 5432 |
| VPC1 | 123 | "FFFF" | 345 |   |

FIG. 11

|  | RETRIEVAL DATA | | | ASSOCIATIVE DATA | |
|---|---|---|---|---|---|
|  | EB | VPI IN | VCI IN | VPI OUT | VCI OUT |
| VCC1 | 0 | 7AC | 5AB0 | 902 | A77F |
| VCC2 | 0 | 7BC | 7890 | 802 | 5432 |
| VPC1 | 1 | 123 | XXXX | 345 | XXXX |

FIG. 12

| RETRIEVAL DATA | | ASSOCIATIVE DATA |
|---|---|---|
| SOURCE IP | PORT NO. | PRIORITY |
| 192.168.1.3 | 80 | 2 |
| 192.168.1.3 | 23 | 3 |
| 192.168.1.3 | 110 | 1 |
| 192.168.1.10 | 21 | 4 |
| 192.168.1.10 | 23 | 4 |
| 192.168.1.10 | 25 | 4 |

FIG. 13

| RETRIEVAL DATA | | | ASSOCIATIVE DATA |
|---|---|---|---|
| EB | SOURCE IP | PORT NO. | PRIORITY |
| 0 | 192.168.1.3 | 80 | 2 |
| 0 | 192.168.1.3 | 23 | 3 |
| 0 | 192.168.1.3 | 110 | 1 |
| 1 | 192.168.1.10 | 00 | 4 | ns
METHOD AND APPARATUS FOR DATA RETRIEVAL

BACKGROUND OF THE INVENTION

1 Field of the Invention

The present invention relates to a method and an apparatus for data retrieval using binary search.

2. Description of the Related Art

When binary search is used, one kind of a mask pattern is employed which is used in the retrieval of one time. However, during retrieval, in some situations only a portion of retrieval key data and a portion of retrieval object data need to coincide with each other while in other situations all of the retrieval key data and all of the retrieval object data need to coincide with each other. One example thereof is a case in which Virtual Path Identifier/Virtual Channel Identifier (VPI/VCI) translation is carried out in an Asynchronous Transfer Mode (ATM) switch.

In this case, notations VPI and VCI designate identifiers added to respective cells of ATM. VPI determines which virtual path is to be used and VCI determines which virtual channel is be used. In this situation, VCI determines which virtual channel multiplexed to a virtual path is used to transmit data to another party. In the case of Virtual Path Connection (VPC), switching is carried out only based on VPI information. In the case of Virtual Channel Connection (VCC), switching is carried out based on information of the two values of VPI and VCI.

In VPI/VCI translation, VPI and VCI constitute retrieval key data. Accordingly, when VCC is used, a result of retrieval must be determined based on both values of VPI and VCI. However, when VPC is used, a result of retrieval is determined based on only the value of VPI. For example, consider the case shown in FIG. 8. When VPI of a cell which enters a switch is 7AC and VCI is 5AB0, the cell is transmitted by replacing VPI by 902 and VCI by A77F. Further, when VPI of a cell which enters the switch in 7BC and VCI is 7990, the call is transmitted by replacing VPI by 802 and VCI by 5432. When VPI of a cell which enters the switch is 123, the cell is transmitted by replacing VPI by 345 regardless of a value of VCI.

When this is realized in a conventional retrieval apparatus which can use only one mask pattern in one time of retrieval, content of a retrieval table is ax shown by FIG. 9, Data of one set of VPI and VCI is inputted as retrieval key data and compared with values of VPIin and VCIin and in the case of coinaidence, VPIout and VCIout are outputted as associative data. In this case, VPI and VCI belonging to the same VPC need to register respectively and individually.

Hence, in order to differentiate whether registered data is VPC or VCC, a specific value of VCI is used as a special value to identify the differentiation. For example, consider a case in which "FFFF" of VCI is used as a value for identifying VPC. Then, a resistor table is as shown by FIG. 10. When registration is carried out in such a style, a region of the table can be saved. Although one entry is saved in this example, as VPC becomes greater, or as data belonging to one VPC becomes greater more of the table can be saved. However, a specific value of VCI is used as an identifier of VPC and therefore, there poses a problem in which a restriction, which has not been present inherently, is added to an outside system.

As described above, in retrieval operation, there is one case where a portion of retrieval key data and a portion of retrieval object data may coincide with each other and there is another case where all of the retrieval key data and all of the retrieval object data must coincide with each. In this situation the retrieval needs to be carried out by dividing retrieval operation into plural times thereof by using different mask patterns, or mask data needs to be stored for each entry of the retrieval object data, or data needs to be registered by using a special value.

However, it is apparent that in the case of multiple retrievals, the time period required for the retrieval is increased. In the case of holding mask data for each entry, a capacity for holding data is doubled. Further, in the case of registering data by using a special value, the value cannot be used when a recognition of a total of data is needed.

SUMMARY OF THE INVENTION

The invention provides methods and apparatus that retrieve data using a binary search based on a plurality of retrieval conditions without increasing a number of times of retrieval and without complicating constitutions of retrieval key data and mask data.

According to one aspect of the invention, in data retrieval using binary search, data constituting a retrieval object is classified into a plurality of blocks. Bit string indicating information is provided which contributes to retrieval results of the respective blocks (coincidence condition for determining that coincidence may be regarded to establish when coincidence of some of the blocks is established). Further, the retrieval key data corresponding with the blocks and are compared with respective object blocks. A result of coincidence or non-coincidence, in accordance with the coincidence conditions, is output by the comparison results and the bit string. Thereby, the above-described problem is solved by carrying out the retrieval operation only once under a plurality of retrieval conditions.

Further, in order to resolve the above-described problem, according to other aspect of the invention, there is provided an apparatus of retrieving data, wherein when retrieval object data is classified into higher order bits and lower order bits, a portion of the retrieval key data, in correspondence with the higher order bits, is defined as first key data. A portion of the retrieval key data, in correspondence with the lower order bits, is defined as second key data. The data retrieval apparatus includes a higher order bit comparing circuit for comparing the higher order bits of the retrieval object data with the first retrieval key data, a lower order bit comparing circuit for comparing the lower order bits of the retrieval object data with the second retrieval key data, and a determining circuit for determining coincidence or non-coincidence between the retrieval key data and the retrieval object data. The determining circuit determines coincidence based on comparison enabling bits indicating coincidence conditions, a comparison result of the higher order bit comparing circuit and a comparison result of the lower order bit comparing circuit.

With the present invention, bits are provided that indicate whether respective blocks, constituting entries, contribute to retrieval for the respective entries of different retrieval object data. The retrieval object data is classified into higher order bits and lower order bits and stored.

A portion of the retrieval key data, in correspondence with the higher order bits of the retrieval object data, constitutes first retrieval key data and a portion thereof, in correspondence with the lower order bits constitutes second retrieval key data.

In this way, the first retrieval key data is compared with the higher order bits in the retrieval object data and the second retrieval key data is compared with the lower order bits in the retrieval object data. Further, coincidence or non-coincidence between the retrieval key data and the retrieval object data is determined in accordance with a comparison enabling bit indicating coincidence conditions, a comparison result of the higher order bits and a comparison result of the lower order bits.

For example, one entry comprising 32 bits which is retrieval object data is classified into three portions and includes a highest order of 1 bit, a high order of 15 bits and a low order of 16 bits. The highest order of 1 bit is a comparison enabling bit EB. Retrieval key data is constituted by 31 bits and higher order 15 bits constitute first retrieval key data PK and lower order 16 bits constitute second retrieval key data SK.

The comparison enabling bit EB indicates coincidence conditions of whether coincidence of only the first retrieval key data PK is validated. When the comparison enabling bit EB is "1", the retrieval hits by coincidence of only the first retrieval key data PK. Meanwhile, when the comparison enabling bit EB is "0", the retrieval hits only when the coincidence is established in both of the first retrieval key data PK and the second retrieval key data SK. Further, the comparison enabling bit EB can designate validity or invalidity for respective entries.

There are two signals that indicate retrieval results, coincidence (hit) signal HON and a partial coincidence (hit) signal PKHON. The coincidence signal HON is a signal indicating a result of whether the retrieval succeeds (coincidence is established partially or totally) and is "1" when it succeeds and "0" when it does not succeed. The partial coincidence signal PKHON indicates when the retrieval succeeds (RON="1"), whether coincidence is established only with the first retrieval key data PK or coincidence is established both in the first retrieval key data PK and the second retrieval key data SK. When coincidence is established only with the first retrieval key data PK, the partial coincidence signal is "1." When coincidence is established with both of the first retrieval key data PK and the second retrieval key data SK, the partial coincidence signal is "0."

For example, when there exists an entry in which coincidence in established only with the first retrieval key data PK, or coincidence in established with both of the first retrieval key data PK and the second retrieval key data SK in the retrieval object data, and the comparison enabling bit EB of the entry is "1," both of the coincidence signal HON and the partial coincidence signal PKHON become "1." In this case, the entry is regarded to hit when coincidence is established with the first retrieval key data PK regardless of coincidence or non-coincidence of the second retrieval key data SK.

Further, when there exists an entry in which coincidence is established with both of the first retrieval key data PK and the second retrieval key data SK and the comparison enabling bit KB of the entry is "0," the coincidence signal HON becomes "1" and the partial coincidence signal PKHON becomes "0." When there is only an entry in which coincidence is established only with the first retrieval key data and the comparison enabling bit EB is "0," both of the coincidence signal HON and the partial coincidence signal PKHON become "0."

By applying the invention, there can be carried out simultaneously VPI/VCI translation of ATM as mentioned later.

BRIEF DESCRIPTION OF THE DRAWINGS

The preferred embodiments of the present invention will be described with reference to the following drawings, wherein like numerals designate like elements, and wherein:

FIG. 11 shows an exemplary retrieval table of a data retrieval apparatus used in VPI/VCI translation according to the present invention;

FIG. 12 shows a retrieval table of a conventional data retrieval apparatus used in a network switch; and FIG. 13 shows an exemplary retrieval table of a data retrieval apparatus used in a network switch according to the present invention.

DETAILED DESCRIPTION OF PREFERRED EMBODIMENTS

Figure 1:
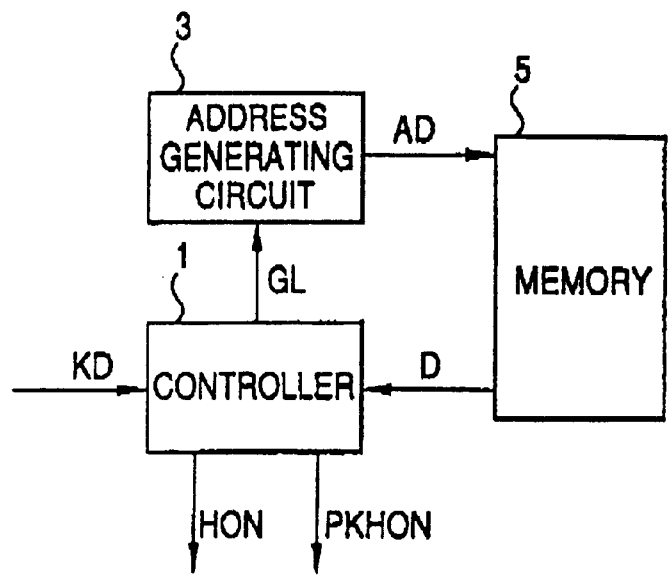
FIG. 1 is an exemplary block diagram showing a data retrieval apparatus of one embodiment of the invention.

FIG. 1 is an exemplary block diagram showing a total constitution of an embodiment of a data retrieval apparatus according to the invention. The data retrieval apparatus comprises a controller 1, an address generating circuit 3 and a memory 5. According to the data retrieval apparatus, an address AD generated by the address generating circuit 3 is supplied to the memory 5. In this way, retrieval object data D read from the memory 5 is subject to retrieval operation by binary search while being compared with retrieval key data KD constituted by first retrieval key data PK and second retrieval key data SK. In such a binary search, the address generating circuit 3 outputs a successive address AD to read successive retrieval object data in accordance with large or small comparison data signal GL output from the controller 1. Further, a result of the binary search is output as a coincidence signal HON and a partial coincidence signal PKHON.

Figure 2:
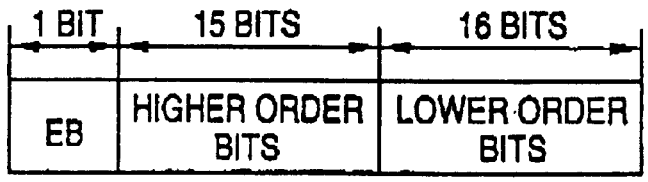
FIG. 2 shows an exemplary retrieval table used in an embodiment of the data retrieval apparatus according to the invention.

FIG. 2 shows an exemplary retrieval table used in an embodiment of the data retrieval apparatus according to the invention. The length of the retrieval key data is 31 bits in this example, but may be any suitable length. When a comparison enabling bit EB is "0." a determination result of coincidence is output only when coincidence of all of the 31 bits is established (HON="1", PKHON="0"). When the comparison enabling bit EB is "1", a determination result of coincidence is output when coincidence of the first retrieval key data PK (PK being the higher order 15 bits of the retrieval key data) is established regardless of coincidence or non-coincidence of the second retrieval key data SK (SK being the lower order 16 bit) (HON="1", PKHON="1").

Figure 3:
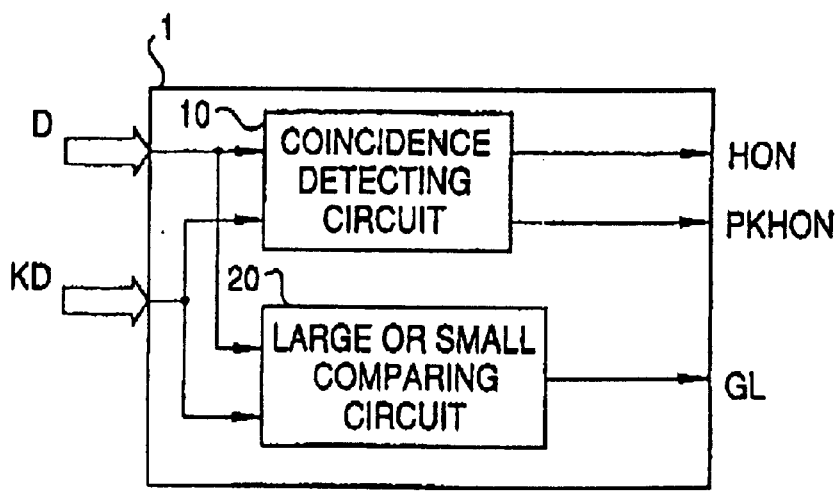
FIG. 3 is an exemplary block diagram showing a controller used in an embodiment of the data retrieval apparatus according to the invention.

FIG. 3 is an exemplary block diagram showing a first embodiment of a controller used in an embodiment of the data retrieval apparatus according to the invention. The controller 1 comprises a coincidence detecting circuit 10 and a large or small comparing circuit 20.

Figures 4, 5:
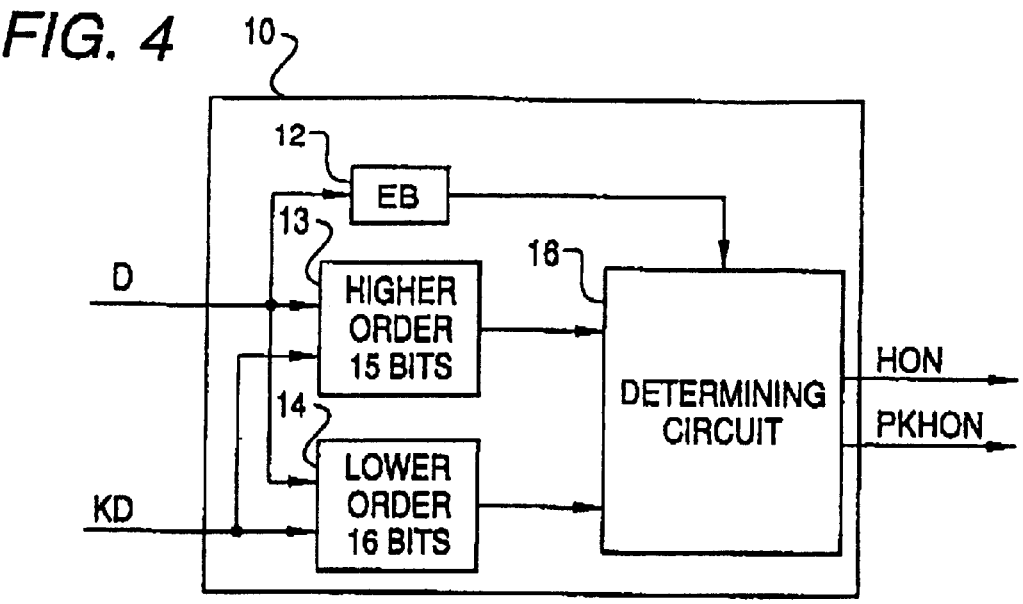
FIG. 4 is an exemplary block diagram showing a constitution of a coincidence detecting circuit used in the embodiment of the data retrieval apparatus according to the invention.
FIG. 5 shows an exemplary truth table indicating operation of the coincidence detecting circuit.

FIG. 4 is an exemplary block diagram showing an embodiment of the coincidence detecting circuit 10. The coincidence detecting circuit 10 contains a register 12 for storing the inputted comparison enabling bit EB, a higher order bit comparing circuit 13 for comparing upper 15 bits of the retrieval object data D with the first retrieval key data PK in the retrieval key data KD, a lower order bit comparing circuit 14 for comparing lower 16 bits of the retrieval object data D with the second retrieval key data SK in the retrieval key data KD and a determining circuit 16. The coincidence detecting circuit 10 forms and outputs the coincidence signal HON and the partial coincidence signal PKHON based on a determination result of coincidence of the higher order bits, a determination result of coincidence of the lower order bits and the comparison enabling bit EB, as shown in the exemplary truth table in FIG. 5.

Next, the large or small comparing circuit 20, shown in FIG. 3, carries out large or small comparison of data of 31 bits. The large or small comparison circuit 20 may not be a circuit for particularly determining coincidence. This is because a coincidence determination can be carried out by the coincidence detecting circuit 10. The large or small comparing circuit 20 forms and outputs a largo or small comparison result signal GL in accordance with large or small comparison of the retrieval key data and the retrieval object data.

Figures 6, 7:
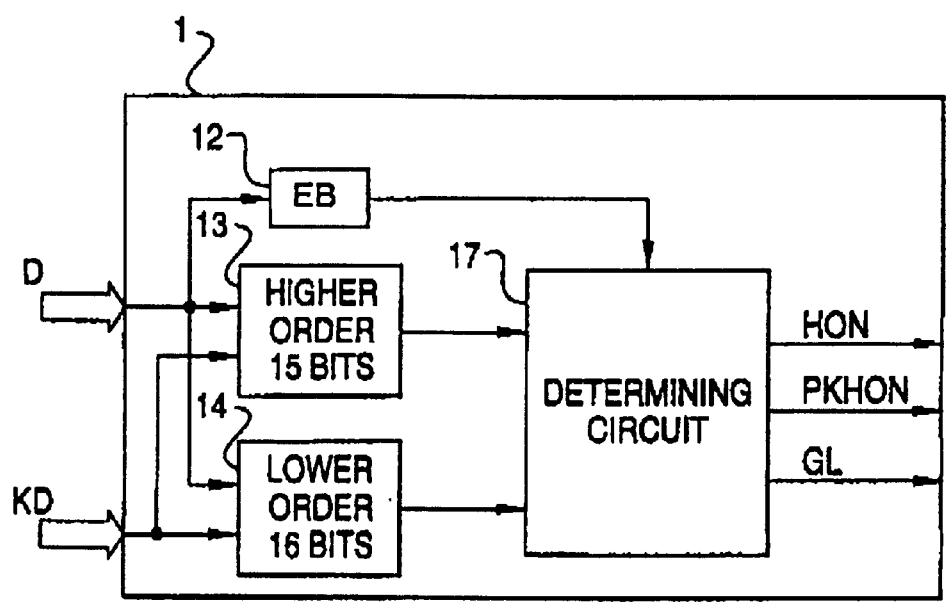
FIG. 6 shows an exemplary truth table indicating operation of a large or small comparing circuit used in an embodiment of the data retrieval apparatus according to the invention.
FIG. 7 is an exemplary block diagram showing a second embodiment of a controller used in an embodiment of the data retrieval apparatus according to the invention.

FIG. 7 is an exemplary block diagram showing a constitution of a second embodiment of the controller 1. As illustrated, the controller 1 includes the register 12, the higher order bit comparing circuit 13, the lower order bit comparing circuit 14 and a determining circuit 17. The comparing circuit 13 and the comparing circuit 14 are large or small comparing circuits including detection of coincidence of higher order 15 bits and lower order 16 bits, for example. The determining circuit 17 first forms and outputs the coincidence signal HON and the partial coincidence signal PKHON based on a determination result of coincidence of higher order bits, a determination result of coincidence of lower order bits and the comparison enabling bit EB as shown in the exemplary truth table of FIG. 5. Then, the determining circuit 17 forms and outputs the large or small comparison result signal GL based on the determination result of coincidence of higher order bits, a large or small determination result of higher order bits and a large or small determination result of lower order bits as in the exemplary truth table of FIG. 6.

According to the above disclosed embodiments of the data retrieval apparatus of the invention, in carrying out retrieval operation by binary search, the retrieval object data is classified into three portions, the higher order 15 bits, the lower order 16 bits and 1 bit of the comparison enabling bit EB. Coincidence or non-coincidence in detected in accordance with the comparison result of the higher order bits, the comparison result of the lower order bits and the comparison enabling bit EB.

The invention is not limited to the above disclosed embodiments for example, the retrieval object data can be classified into four blocks of first through fourth bits and comparison enabling bits EB comprising 2 bits. Retrieval operation is carried out by setting to validate a coincidence condition by 2 bits of the comparison enabling bits EB, for example, coincidence of only the first block or coincidence of both of the first and the second blocks in this way, it is possible to classify the retrieval object data into a plurality of blocks and carry out retrieval operation validating coincidence by combinations of the blocks.

Although an explanation has been given with 32 bits (among them, 1 bit being allocated to comparison enabling bit EB) of retrieval object data, the invention is also applicable to other data sizes. For example, 64 bits or 128 bits and a number of classifying data. Additionally, a bit constitution of each classified block can arbitrarily be constituted. Further, the bit of the comparison enabling bit EB may be determined according to a number of classified blocks.

Although a description has been given of retrieval operation in a binary search according to the disclosed embodiments of the invention, the invention is not limited thereto. For example, retrieval object data may be read from memory successively according to addresses. The retrieval object data and the retrieval key data may then be classified and compared.

A description will now be given of VPI/VCI translation to which a method and an apparatus of data retrieval according to the invention are applied.

Figures 8, 9, 10:
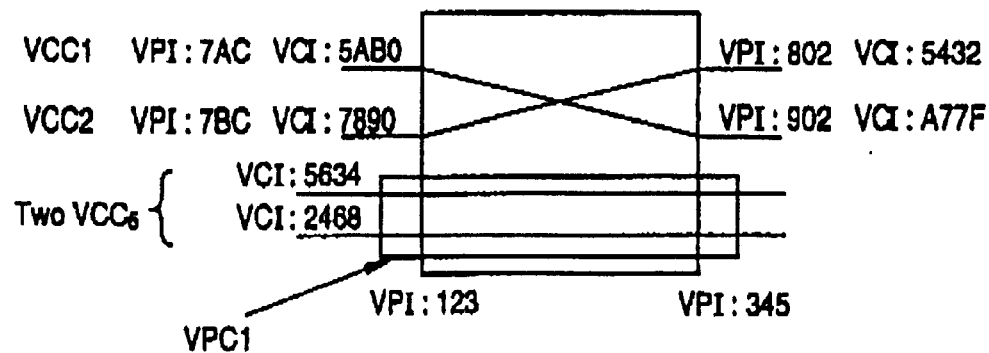
FIG. 8 is a diagram showing VPI/VCI translation.
FIG. 9 shows a retrieval table of a conventional data retrieval apparatus used in VPI/VCI translation.
FIG. 10 shows another retrieval table of the conventional data retrieval apparatus used in VPI/VCI translation.

Consider again the case of FIG. 8 mentioned above. When the invention is applied, as shown by FIG. 11, the comparison enabling bit EB is provided and a portion for comparing with retrieval key data can be selected for each entry. Thereby, as in the conventional case (FIG. 10), a table can be saved without providing a restriction to which a specific value of VCI constitutes an identifier of VPC. In the table of the drawing, in the case of EB of "1," comparison is carried out only at the portion of VPI and accordingly, an arbitrary value may be written to a location designated by "XXXX".

Consider a network switch to which the invention is applied. In the network switch, four steps of priorities are attached to respective packets. The priority is determined by an IP address of a terminal which has transmitted a packet and a port number (identifier of an application). Depending on terminals, a constant priority is always given regardless of the application. According to a conventional retrieval apparatus, data needs to register always in respect of all of applications even when the priority is determined only by a transmitted IP address.

For example, a priority of 4 is given to any packets which an IP address of 192.168.1.10. regardless of the application. A retrieval table in a conventional retrieval apparatus is shown by FIG. 12.

As shown by FIG. 13, for example, when the invention is applied, table space can be saved in comparison with that of the conventional retrieval operation. In the case of an EB of "1", comparison is carried out with only Source IP and in the case an EB of "0", comparison is carried out with Source IP and Port No. Although in this case, Port No. is used, Destination IP Address, other data indicating attributes of a packet, and other combinations may be used without departing from the spirit and scope of the present invention.

As has been described, by the method and the apparatus of data retrieval according to the invention, a binary search based on a plurality of retrieval conditions can be carried out without increasing a number of retrieval times and without complicating constitutions of retrieval key data and mask data.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. An apparatus for retrieving data, wherein retrieval key data is classified into first retrieval key data of higher order bits and second retrieval key data of lower order bits, said apparatus of retrieving data comprising:

a higher order bit comparing circuit for comparing the first retrieval key data with higher order bits of retrieval object data;

a lower order bit comparing circuit for comparing the second retrieval key data with lower order bits of the retrieval object data; and a determining circuit for determining a coincidence or a non-coincidence between the retrieval key data and the retrieval object data in accordance with:

a comparison enabling bit, other than the retrieval key data and the retrieval object data, that indicates coincidence conditions, a comparison result of the higher order bit comparing circuit, and a comparison result of the lower order bit comparing circuit.

2. The apparatus for retrieving data according to claim 1, further comprising:

a storing device for storing the higher order bits, the lower order bits by which the retrieval object data is classified and comparing bits indicating coincidence conditions of classified data.

3. The apparatus for retrieving data according to claim 1, wherein the determining circuit outputs a signal representing coincidence or non-coincidence between the retrieval key and the retrieval object data and outputs a signal indicating at which portion the coincidence is established in the case of the coincidence.

4. An apparatus for retrieving data based on retrieval key data, comprising:

circuitry for classifying retrieval object data into at least two or more of a plurality of blocks and storing the retrieval object data along with comparison enabling data, other than the retrieval key data, for indicating coincidence conditions of the plurality of blocks;

a plurality of comparing devices for classifying retrieval key data in correspondence with the plurality of blocks and for respectively comparing the retrieval key data with the plurality of blocks; and a determining circuit for determining coincidence or non-coincidence between the retrieval key data and the retrieval object data based on the comparison enabling data and comparison results of the plurality of comparing devices.

5. The apparatus of retrieving data according to claim 4, wherein the determining circuit outputs a signal representing the coincidence or the non-coincidence between the retrieval key data and the retrieval object data and a signal indicating at which portion the coincidence is established in the case of the coincidence.

6. An apparatus for retrieving data comprising:

a storage device for storing retrieval object data and comparison enabling data other than retrieval key data;

an address generating circuit for generating an address for storing to and reading the retrieval object data from the storage device; and a control circuit for comparing data read from the storage device with retrieval key data;

wherein the control circuit comprises:

a plurality of comparing circuits for comparing the retrieval object data with the retrieval key data;

circuitry for classifying the retrieval object data and the retrieval key data into pluralities of blocks of classified retrieval object data and classified retrieval key data, and supplying the classified retrieval object data and the classified retrieval key data to the comparing circuit; and a determining circuit for determining coincidence or non-coincidence between the retrieval key data and the retrieval object data based on comparison results of the comparing circuit and based on the comparison enabling data.

7. The apparatus of retrieving data according to claim 6, wherein the control circuit provides the address generating circuit with information of the compared retrieval object data and retrieval key data for generating the address and outputs a determination result in accordance with retrieval conditions.

8. The apparatus of retrieving data according to claim 7, wherein the comparison results indicate whether the retrieval key data and the retrieval object data either partially coincide with each other or totally coincide with each other.

9. The apparatus of retrieving data according to claim 6, wherein the determining circuit outputs a signal representing the coincidence or the non-coincidence between the retrieval key data and the retrieval object data and a signal indicating at which portion the coincidence is established in the case of the coincidence.

* * * * *